United States Patent
Toudeh-Fallah et al.

(10) Patent No.: US 7,420,919 B1
(45) Date of Patent: Sep. 2, 2008

(54) SELF CONVERGING COMMUNICATION FAIR RATE CONTROL SYSTEM AND METHOD

(75) Inventors: Farzam Toudeh-Fallah, Santa Clara, CA (US); Hariprasad Ginjpalli, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 858 days.

(21) Appl. No.: 10/705,152

(22) Filed: Nov. 10, 2003

(51) Int. Cl.
 *H04L 12/26* (2006.01)
(52) U.S. Cl. ...................................... 370/235; 370/412
(58) Field of Classification Search ....................... None
 See application file for complete search history.

(56) References Cited

U.S. PATENT DOCUMENTS

| | | | | |
|---|---|---|---|---|
| 6,463,484 | B1 | 10/2002 | Moss | 710/36 |
| 6,526,060 | B1 | 2/2003 | Hughes et al. | 370/395.4 |
| 6,597,662 | B1 * | 7/2003 | Kumar et al. | 370/236 |
| 6,680,907 | B1 * | 1/2004 | Bonaventure | 370/229 |
| 2003/0037158 | A1 * | 2/2003 | Yano et al. | 709/232 |
| 2003/0123392 | A1 * | 7/2003 | Ruutu et al. | 370/235 |

OTHER PUBLICATIONS

M. Karol, M. Hluchyj and S. Morgan in "Input versus Output Queuing on a Space-Division Packet Switch". IEEE Transactions on Communications, vol. COM-35, No. 12, Dec. 1987.

N. McKeown, S. Iyer and R. Zhang in "Routers with a Single Stage of Buffering", Proc. Of ACM SIGCOMM, Aug. 2002.

N. McKeown in "SLIP: A Scheduling Algorithm for Input-Queued Switches", IEEE Transactions on Networking, vol. 7, No. 2, Apr. 1999.

Y. Tamie and S.C. Chi, "The Symmetric Crossbar Arbiters for VLSI Communication Switches", IEEE Transactions on Parallel and Distributed Systems, vol. 4, No. 1, pp. 13-27. Jan. 1993.

N. McKeown, "A Fast Swtiched Backplane for aGigabyte Switched Router", Business Communication Review, Dec. 1977.

* cited by examiner

*Primary Examiner*—Huy D. Vu
*Assistant Examiner*—Rhonda Murphy
(74) *Attorney, Agent, or Firm*—Stolowitz Ford Cowger LLP

(57) ABSTRACT

Self converging communication fair rate control systems and methods of the present invention facilitate fair utilization of node buffers and optimized utilization of available bandwidth. A self converging communication fair rate control method provides a fair rate that is utilized to determine a connection rate for communicating information from a plurality of virtual connection queues to a class of service buffer (COSB). The self converging communication fair rate control method includes establishing a self-convergence factor, determining a buffer flow ratio, and adjusting a fair rate value based upon the buffer flow ratio and the self-convergence factor. The buffer is divided into buffer fill regions designated by fair rate convergence-adaptation thresholds and are associated with self-convergence factors. The fair rate self-convergence factors dynamically decrease fair rate values that result in a buffer filling up and increase fair rate values that result in a buffer emptying out.

25 Claims, 5 Drawing Sheets

SELF CONVERGING COMMUNICATION FAIR RATE CONTROL SYSTEM AND METHOD

FIELD OF THE INVENTION

The present invention relates to information communication. In particular, the present invention relates to a communication bandwidth distribution system and method.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity in analyzing and communicating data, ideas and trends in most areas of business, science, education and entertainment. Often these advantageous results are achieved through the use of distributed resources that communicate with each other over a network. Networks typically include a variety of nodes coupled together by various links or paths. The rate at which a network communicates information between nodes is referred to as bandwidth and it is usually desirable for the information to be communicated smoothly and at a rapid rate. However, it is often difficult to precisely measure the dynamic bandwidth available within a node and coordinate information departure from the node at a desirable rate in accordance with available bandwidth.

Communication networks typically include numerous different components with various capabilities and limitations. Controlling information traffic flow smoothly without glitches over a network of diverse components is often complicated and difficult. There are a number of different communication traffic flow problems that can arise in a communication network and these problems often result in undesirable consequences such as high latency and/or dropped information. Further complicating bandwidth control is the variety of different traffic rates that typically occur in a network. For example, varying rates can cause significant planning or scheduling issues, such as unpredictable available rates at nodes with fixed maximum input and/or output capacities. Tremendous growth in communication traffic due to a seemingly insatiable desire for new services has led to greater demand for increased rate and bandwidth capabilities. However, increasing the upper bounds on rates at which the information is communicated tends to exacerbate information flow control problems.

One traditional approach to communicating information via a network includes "cell switching" in which digital information is segmented into units called "cells" (e.g., fixed size packets) that are transmitted from a source node to a destination node through a "connection" in a digital network. A communication link can usually communicate or carry a variety of different connections simultaneously. Accordingly, cells belonging to each connection are often handled or serviced differently at each node (e.g., router, switch, etc.) in order to meet overall network goals. To assist servicing of a cell, many traditional routers or switches include a memory or buffer used for temporarily holding or storing information in a "queue" prior to transmission on a communication link. Servicing of a buffer is usually accomplished by sending information (e.g., a cell) from that buffer out "into" the network on a communication link. For example, the information is removed from its associated memory or buffer and forwarded on the network towards its final destination.

The information is usually forwarded in accordance with a scheduling scheme that determines when the information is sent. Scheduling schemes are usually a critical part of managing information flow through individual nodes and a network as a whole. Bandwidth is typically limited and managing the information flow is often critical to end use applications. For example, some end user sophisticated applications may have a need for information to be communicated in real time with relatively small latency while other non sophisticated applications can endure some latency. However, the non sophisticated applications may be critical for some operations and depriving them of bandwidth opportunity can be devastating. Thus, it is important for scheduling schemes to maintain appropriate information flow.

In Asynchronous Transfer Mode (ATM) the information is segmented into equal sized cells or packets and usually involves precise rate control for each connection. ATM scheduling of available bit rate (ABR) and weighted fair queue (WFQ) flows typically mandates distribution of available bandwidth to active flows or connections based upon the weights assigned to the flow or connection. The buffers included in ATM nodes (e.g., routers, switches, etc.) typically provide an information reservoir for assisting smooth communication flow. While a buffer can often provide some assistance in maintaining a smooth flow of information, the "buffering" capacity is usually limited and the rate at which information is queued in the buffer can cause problems. If the rate is too high the buffer usually overfills and the information is dumped. If the rate is too low the buffer usually empties and bandwidth is not fully utilized. As communication rates increase, controlling buffer fill levels and smooth flow of information through a router or switch, efficiently utilizing available bandwidth, and providing accurate rate information to other network components usually becomes more difficult.

SUMMARY

A system and method for controlling communication traffic through a network node is presented. Self converging communication fair rate control systems and methods of the present invention facilitate fair utilization of buffers and optimized utilization of available bandwidth. In one embodiment of the present invention, a self converging communication fair rate control method establishes a fair rate value utilized to adjust rates at which information is communicated from a plurality of inputs to a buffer. For example, a self converging fair rate control method can be utilized in the determination of connection rates for communicating information from a plurality of virtual connection buffers to a class of service buffer (COSB). Self-convergence factors are established and utilized to adjust a fair rate towards a value that drives an actual buffer fill level towards a target buffer fill level. The self-convergence factors are based upon buffer fill regions (e.g., a COSB is segmented into buffer fill regions). The buffer fill regions are defined by convergence-adaptation thresholds and the self-convergence factors are associated with the buffer fill regions. In one exemplary implementation, by utilizing a fair rate value in the determination of a buffer input communication rate (e.g., a connection rate) the present invention facilitates fair access by multiple input streams to the buffer and optimized utilization of available bandwidth.

It is appreciated that the present invention can include a variety of buffer fill region configurations. One buffer fill region is a convergence region and includes buffer fill levels that are acceptable for efficient utilization of node bandwidth.

Another buffer fill level is an almost full region and is a buffer fill region in which the buffer (e.g., a COSB) is on the verge of overflowing. Conversely, another buffer fill region is an almost empty region and is a buffer fill region in which the buffer (e.g., a COSB) is on the verge of emptying out. The self-convergence factor associated with the almost full region decreases fair rate values that otherwise result in a buffer filling up (e.g., a fractional multiplier less than one) and the self-convergence factor associated with the almost empty region increases fair rate values that otherwise result in a buffer emptying out (e.g., a fractional multiplier greater than one). In addition to establishing self-convergence factors, a buffer flow ratio is also determined. For example, the buffer flow ratio can be the ratio of the amount of information moved out of a buffer to the amount of information moved into the buffer in a given period of time. A fair rate value is adjusted based upon the buffer flow ratio and the self-convergence factor.

In one embodiment, the fair rate is initialized to an initial value and is dynamically adjusted towards a rate that corresponds to a target buffer fill level of a class of service buffer and a plurality of connection queues are serviced within the network according to a connection rate based upon the fair rate. The connection rate can be weighted for each of the connection queues. The connection queues can be serviced by moving information (e.g., cells) from one or more of the connection queues to a class of service queue within the class of service buffer. The information (e.g., cells) is moved into the COSB at the connection rate. The fair rate can be computed by multiplying a previous fair rate by a buffer flow ratio and a self-convergence factor. The execution of the fair rate adjustment can be performed in response to various events or conditions. For example, the fair rate can be periodically recomputed or recomputed once a predetermined number of cells have been received or have departed (e.g., based on a cell count instead of a time period). In one exemplary implementation, cells within a digital network can be stamped with a connection rate based upon the fair rate value, wherein the connection rate information provides explicit rate control indication to other components within the network.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention facilitates efficient and effective utilization of available bandwidth. Present invention systems and methods provide self-converging fair rate values for adjusting input communication rates (e.g., connection rates) to a buffer (e.g., a COSB). In one embodiment, the present invention facilitates smooth flow of information through a node (e.g., router, switch, etc.) and a network as a whole. For example, buffer input communication rates are adjusted to facilitate maintenance of a target buffer fill level by self-convergence of an actual buffer fill level towards a target buffer fill level. In one exemplary implementation, by adjusting a buffer input communication rate in accordance with a fair rate value that provides self-convergence towards a buffer target fill level (e.g., in a class of service buffer), the present invention facilitates fair access by multiple input streams (e.g., information from multiple connection queues) to the buffer capacity. A present self-converging communication fair rate control or scheduling system and method can also facilitate optimized utilization of available bandwidth by providing buffer fill level self-convergence towards an optimized buffer target fill level. For example, providing convergence towards an optimized buffer target fill level that maintains enough information to optimize utilization of egress bandwidth and maintains enough available storage space to accommodate increases in ingress information without dumping (e.g., a buffer target fill level of half the maximum buffer capacity fill). The present invention also dampens fluctuations in buffer fill levels and buffer input rates that might otherwise occur, especially in buffers (e.g., a COSB) of communication nodes forwarding information at relatively high speeds.

Figure 1A:
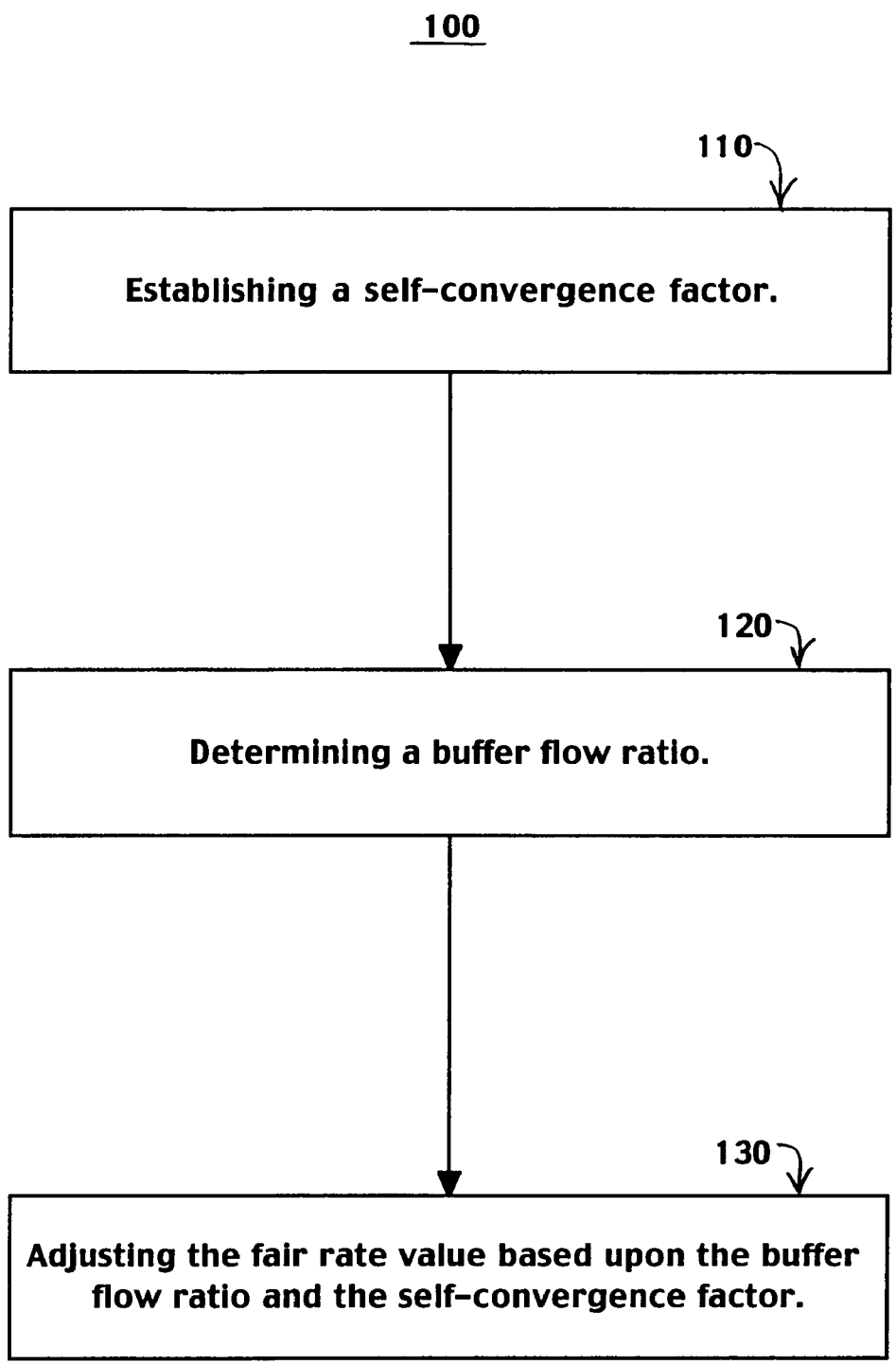
FIG. 1A is a flow chart of a self converging communication fair rate control method in accordance with one embodiment of the present invention

FIG. 1A is a flow chart of a self converging communication fair rate control method 100 in accordance with one embodiment of the present invention. Self converging communication fair rate control method 100 provides a fair rate value for adjusting the rate (e.g., connection rate) at which information is entered in a buffer. The adjustment provides self convergence towards a target buffer fill level while minimizing fluctuations in actual buffer fill levels and input fair rate values. Self converging communication fair rate control method 100 utilizes self-convergence factors to adjust buffer input fair rate values for varying traffic conditions.

In step 110, self-convergence factors are established. In one embodiment of the present invention, self-convergence factors are established based upon buffer fill regions. The self-convergence factors are associated with the buffer fill regions defined by convergence-adaptation thresholds. A self-convergence factor guides a fair rate towards a value that drives an actual buffer fill level towards a target buffer fill level and dampers fluctuations away from the target buffer fill level. In one exemplary implementation, self-convergence factors decrease fair rate values that otherwise result in a buffer filling up and increase fair rate values that otherwise result in a buffer emptying out. The self-convergence factors also minimize fluctuations in the fair rate values.

In step 120, a buffer flow ratio is determined. In one exemplary implementation, the buffer flow ratio is the ratio of the amount of information moved out of a buffer to the amount of information moved into the buffer in a given period of time. In another exemplary implementation, the buffer flow ratio is the ratio of a target rate to an observed or actual rate. Mechanisms for determining a buffer flow ratio are discussed in related U.S. Pat. No. 6,536,060 B1 entitled "Dynamic Rate-Based, Weighted Fair Scheduler with Explicit Rate Feedback Option", which is incorporated herein by reference.

In step 130, a fair rate value is adjusted based upon the buffer flow ratio and the self-convergence factor. In one embodiment, the fair rate is initialized to an initial value and is dynamically adjusted towards a rate that corresponds to a target buffer fill level (e.g., half full). The fair rate can be adjusted by multiplying the previous fair rate by a flow ratio, and a self-convergence factor. One exemplary algorithm for adjusting a fair rate is defined by the following:

$$FR=(FRp)(BFR)(SCF)$$

$$BFR=No/Ni$$

where the present fair rate (FR) is equal to the previous fair rate (FRp) multiplied by the buffer flow ratio (BFR) and a self-convergence factor (SCF). The buffer flow ratio (BFR) is equal to the amount of information leaving a buffer divided by the amount of information entering the buffer. It is appreciated that the execution of the fair rate adjustment can be performed in response to various events or conditions. For example, the fair rate can be periodically recomputed or recomputed once a predetermined number of cells have been received or have departed (e.g., based on a cell count instead of a time period).

Figure 1B:
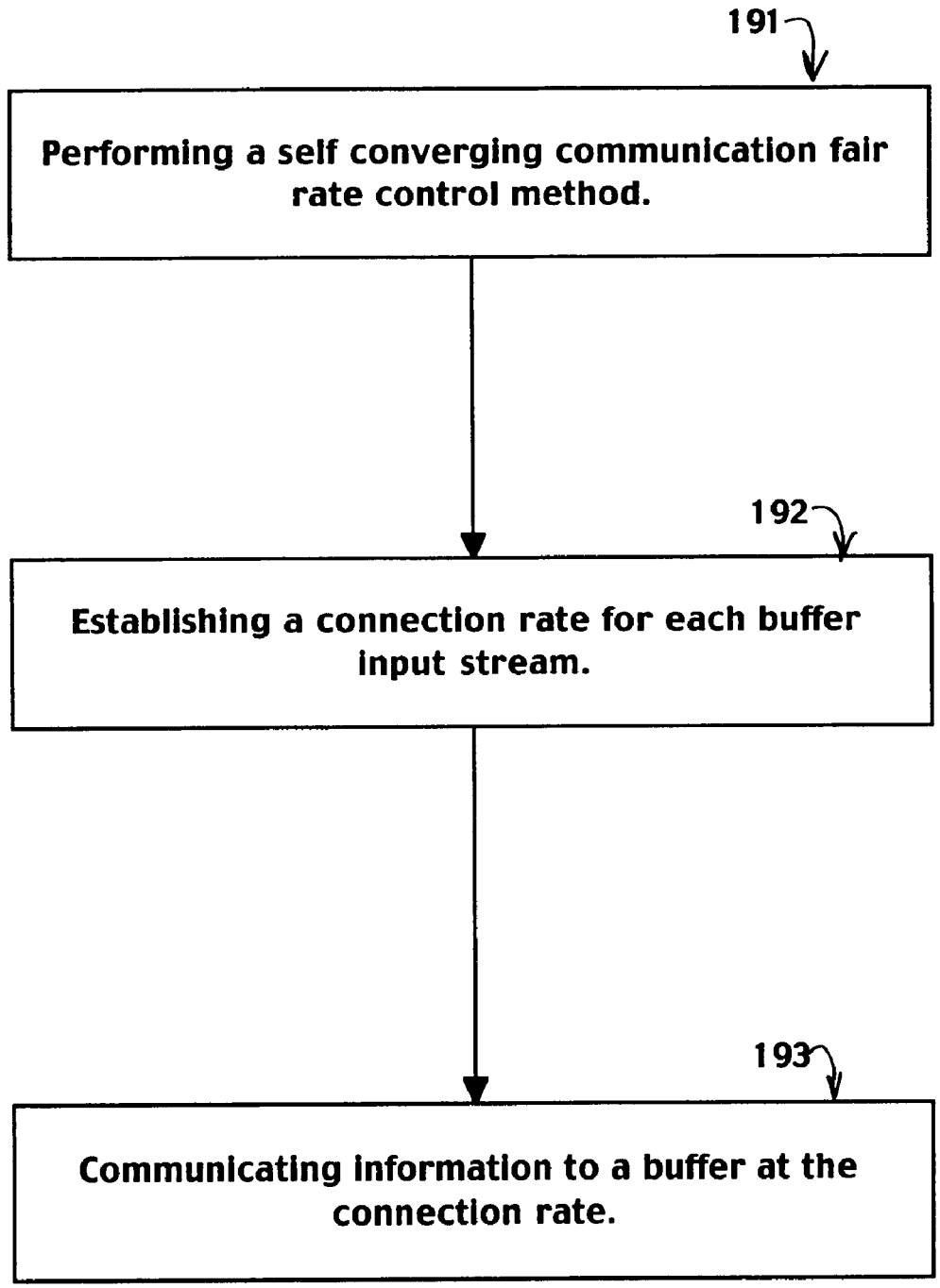
FIG. 1B is a flow chart of a self converging communication fair rate based buffer input control method in accordance with one embodiment of the present invention.

FIG. 1B is a flow chart of a self converging fair rate based buffer input control method 190. Self converging fair rate based buffer input control method 190 directs communication of information into a buffer in accordance with a connection rate that corresponds to a fair rate value. For example, the connection rate can be a fair rate value adjusted by a weighted factor. In one exemplary implementation, self converging fair rate based buffer input control method 190 is utilized to direct communication of information (e.g., cells) from a connection queue in a connection buffer to a class of service queue in a class of service buffer.

In step 191, a self converging communication fair rate control method is performed. In one exemplary implementation, self converging communication fair rate control method 100 is performed. The self converging communication fair rate control method establishes a fair rate value that provides self convergence towards a target buffer fill level while minimizing fluctuations in actual buffer fill levels and input fair rate values. In one embodiment, a fair rate value is adjusted based upon the buffer flow ratio and the self-convergence factor.

In step 192, a buffer input or connection rate for each buffer input stream is established. For example, connection rates are established for communicating information from a plurality of connection queues in connection buffers to a class of service queue in a class of service buffer. The connection rate is based upon the fair rate. In one embodiment of the present invention, the connection rate is the fair rate adjusted in accordance with weighted values associated with each buffer input (e.g., each virtual connection queue). One exemplary algorithm for providing a connection rate is defined by the following:

$$CR=(FR)(WV)$$

where the connection rate (CR) is equal to the present fair rate (FR) multiplied by a weighted value (WV). In one exemplary implementation, the WV corresponds to weighted values utilized in a connection queue servicing process (e.g., a weight modified round robin scheduling approach). In one exemplary implementation, cells within a digital network can be stamped with the connection rate value to provide explicit rate control indication to other components within the network.

In step 193, information is communicated to a buffer at the connection rate. For example, a plurality of buffer inputs (e.g., COSB inputs from a plurality of connection buffers) are serviced (e.g., within a network node) in accordance with the connection rate (e.g., communicated or moved at the connection rate). In one exemplary implementation, connection queues (e.g., in connection buffers) in a communication node (e.g., router, switch, etc.) can be serviced by moving cells at the connection rate from one or more of the connection queues to a class of service queue (e.g., in a COSB).

It is appreciated that self converging communication fair rate control method 100 and self converging fair rate based buffer input control method 190 can be implemented by a variety of mechanisms. For example, self converging communication fair rate control method 100 and self converging fair rate based buffer input control method 190 can be implemented in hardware, software, firmware or combinations thereof. Self converging communication fair rate control method 100 and self converging fair rate based buffer input control method 190 can also be implemented in a variety of network nodes, including switches and/or routers.

In one embodiment of the present invention, a buffer is divided into a plurality of buffer fill regions that provide an indication of desirable fair rate value regulation for varying traffic conditions. In one exemplary implementation, the buffer is divided into five buffer fill regions that are symmetrical with respect to a particular buffer fill target value. One buffer fill region is the convergence region and defines values that are acceptable for efficient utilization of node bandwidth. If a buffer fill level is within the convergence region, a present fair rate is computed based on buffer flow ratio and the previous fair rate (e.g., the self-convergence factor has a value of 1). Another buffer fill region is an almost full buffer region and is a buffer fill region in which the buffer (e.g., a COSB) is on the verge of overflowing. Conversely, another buffer fill region is an almost empty buffer region and is a buffer fill region in which the buffer (e.g., a COSB) is on the verge of underflowing or emptying out. The present exemplary implementation also includes intermediate buffer fill warning regions. One warning buffer fill region is the increased buffer fill warning region and indicates the buffer fill is headed towards the almost full buffer region. A corollary warning buffer fill region is the decreased buffer fill warning region and indicates the buffer fill is headed towards the almost empty buffer region.

Measures are taken to adjust the fair rate so that buffer fill regions other than the convergence region are avoided. For example, in one implementation if the buffer fill level is in the almost full buffer region, the fair rate is heavily scaled down and if the buffer fill level is in the almost empty buffer region, the fair rate is heavily scaled up. If the buffer fill level is in the increased buffer fill warning region, the fair rate is slightly scaled down and if the buffer fill level is in the decreased buffer fill warning region, the fair rate is slightly scaled up.

Figure 1C:
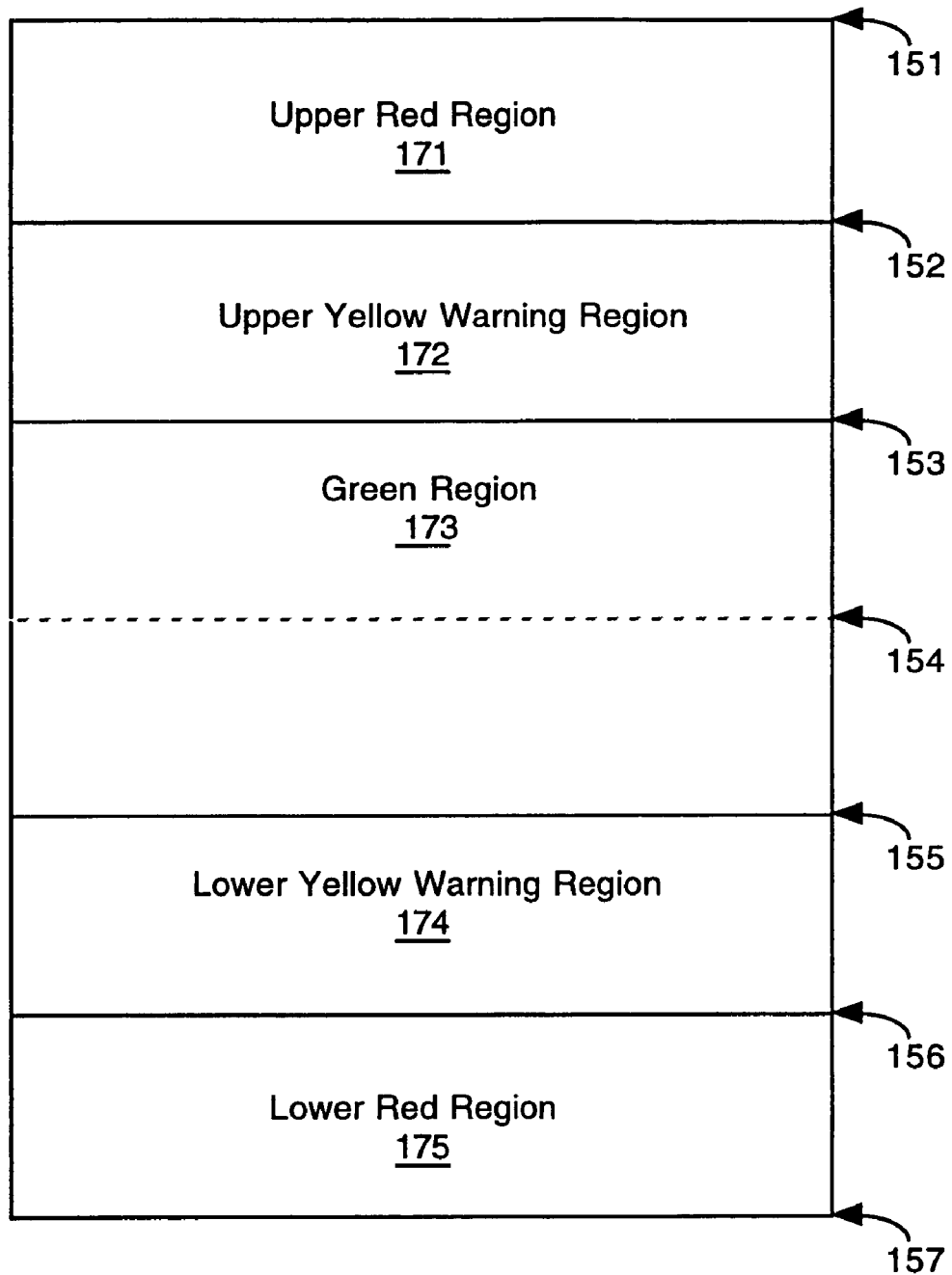
FIG. 1C is a block diagram of a buffer segmented in accordance with one embodiment of the present invention.

FIG. 1C is a block diagram of buffer 150 segmented in accordance with one embodiment of the present invention. Buffer 150 is segmented into buffer fill regions 171 through 175 by convergence-adaptation threshold values (e.g., 151, 152, 153, 155, 156 and 157). Convergence-adaptation threshold value 151 indicates the full maximum capacity fill level of buffer 150 and convergence-adaptation threshold value 157 indicates the empty fill level of buffer 150. Upper red region 171 corresponds to an almost full buffer region and is bounded by the convergence-adaptation thresholds 151 and 152. Upper red region 171 indicates the current rate has the potential to cause the buffer to overfill. Upper warning yellow region 172 corresponds to an increased buffer fill warning region and is bounded by the convergence-adaptation thresholds 152 and 153. Upper warning yellow region 172 indicates the current rate is headed towards the upper red region. Target green region 173 corresponds to a convergence region and is bounded by the convergence-adaptation thresholds 153 and 155. Target green region 173 indicates the rate is within a tolerable range of target buffer fill level 154. Lower warning yellow region 174 corresponds to a decreased buffer fill warning region and is bounded by the convergence-adaptation thresholds 155 and 156. Lower warning yellow region 174 indicates the rate is headed towards the lower red region 175. Lower red region 175 corresponds to an almost empty buffer region and is bounded by the convergence-adaptation thresholds 156 and 157. Lower red region 175 indicates the rate has the potential to cause the buffer to empty.

The buffer fill regions 171 through 175 are associated with different self-convergence factors. The self-convergence factors dynamically direct the fair rate value in self convergence adjustments to a fair rate value that maintains the actual buffer fill level within an acceptable range of a target buffer fill level. The self-convergence factors damper fluctuations that might otherwise happen in the fair rate and consequently in the buffer fill level. In one embodiment, upper red region 171 is associated with a self-convergence factor of 0.5, upper warning yellow region 172 is associated with a self-convergence factor of 0.75, target green region 173 is associated with a self-convergence factor of 1.0, lower warning yellow region 174 is associated with a self-convergence factor of 1.5, and lower red region 175 is associated with a self-convergence factor of 2.0.

In one embodiment, the target buffer fill level is the half full level. A half-full fill level provides an optimization of buffer space for efficient utilization of node bandwidth. For example, if a sudden increase in information flow rate occurs there is approximately half the buffer available to capture the information without dumping or losing the information. Alternatively, if a sudden decrease in information flow rate occurs there is approximately half the buffer capacity available for output to maintain efficient utilization of potentially available bandwidth.

Figure 2:
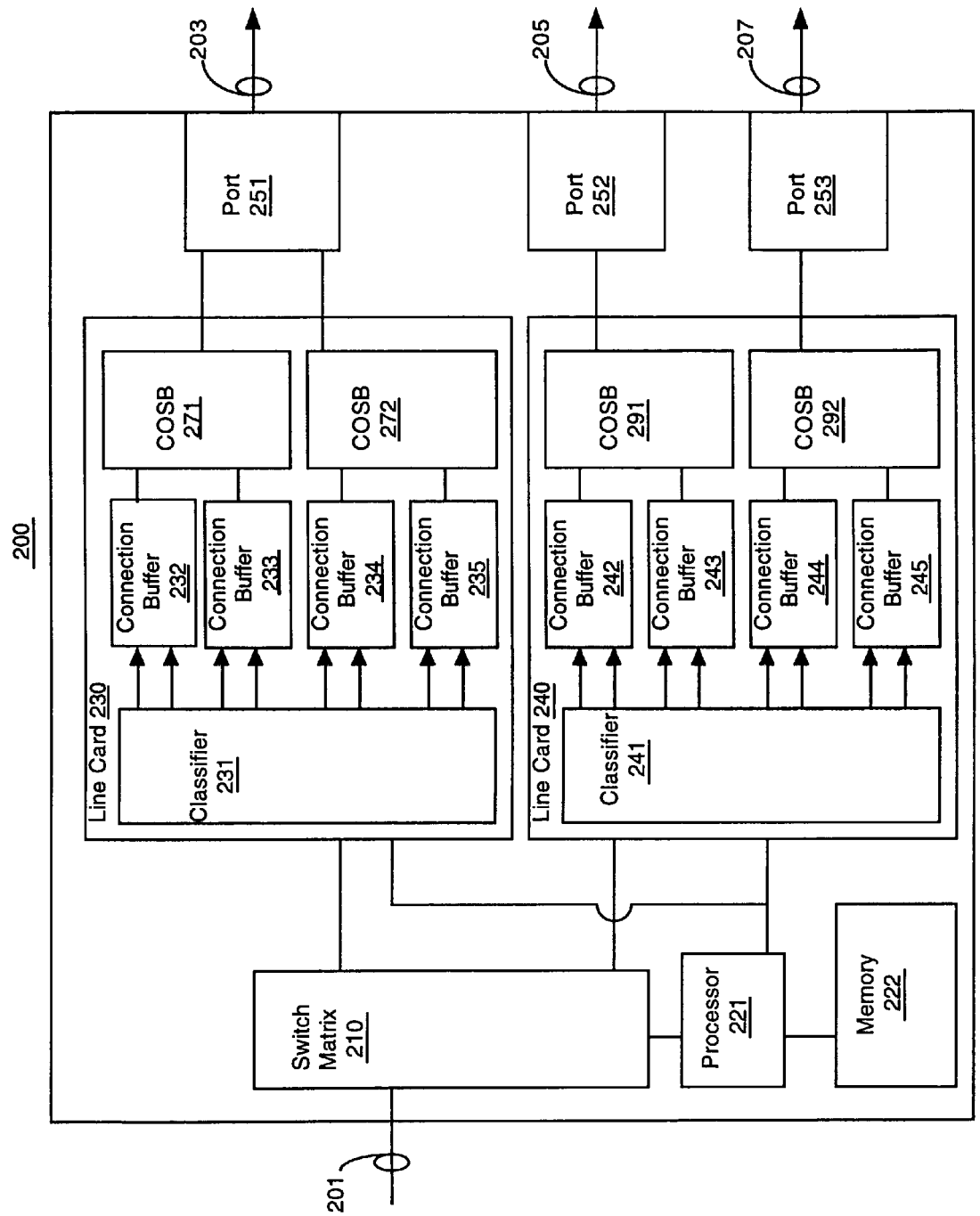
FIG. 2 is a block diagram of a switch system in accordance with one embodiment of the present invention.

FIG. 2 is a block diagram of switch system 200 in accordance with one embodiment of the present invention. It is appreciated that the present invention is readily implemented in a variety of routing and/or switching configurations. Switch system 200 includes switch matrix 210, processor 221, memory 222, line card 230, line card 240, link or port 251, 252 and 253. Processor 221 is coupled to memory 222, switch matrix 210, line card 230 and line card 240. Line card 230 is coupled to port 251 and line card 240 is coupled to port 252 and port 253. Line card 230 includes classifier 231, connection buffers 232, 233, 234 and 235 and Class of Service Buffers (COSB) 271 and 272. Line card 240 includes classifier 241, connection buffers 242, 243, 244 and 245 and Class of Service Buffers (COSB) 291 and 292. It is appreciated that the present invention is readily adaptable for utilization in systems of various configurations, including systems with varying numbers of line cards and ports. The configurations of components within a line card can also vary. For example, each line card can include separate processors and memories and be compatible with a distributed architecture.

The components of switch system 200 cooperatively operate to maximize utilization of available bandwidth. Switch matrix 210 receives ingress or input information on line 201 and routes it to line card 230 or line card 240. The information flow through switch matrix 210 is directed by processor 221 based upon instructions and data stored in memory 222. Line cards 230 and 240 organize information for delivery to ports 251, 252 and 253. Classifiers 231 and 241 classify information based upon a type or class of information and forward the information accordingly to a queue associated with that type or class of information. The connection buffers and class of service buffers temporarily store information for communication via ports 251, 252 and 253. The connection buffers 232 through 235 and 242 through 245 collect information associated with different virtual connections. The class of service buffers 271, 272, 291 and 292 collect information associated with various classes of service. Ports 251, 252 and 253 forward the information on output lines 203, 205 and 207 respectively. It is appreciated the present invention can include a variety of buffer and queue configurations.

Processor 221 also directs scheduling of information flows through line cards 230 and 240. Information from one of the plurality of connection buffers (e.g., 232, 233, etc.) is scheduled for servicing. Servicing includes moving the information from a connection buffer (e.g., 232 and 233) to a COSB (e.g., 271) from where the information is communicated via a port (e.g., 251). In one embodiment of the present invention, the information is serviced or moved from a connection buffer to a COSB at a fair rate adjusted for self-convergence. In one exemplary implementation, processor 221 directs the communication of information from the connection buffers (e.g., 232 and 233) to a COSB (e.g., 271) at a connection rate adjusted based upon a fair rate value. For example, the connection rate is adjusted for buffer fill level or flow of the COSB and buffer target fill convergence in the COSB. For example, the fair rate is adjusted by a buffer flow ratio and a self-convergence factor. The connection rate can also be adjusted by a weighted value. In one embodiment of the present invention, a self converging communication fair rate control method 100 and self converging fair rate based buffer input control method 190 are implemented on processor 221.

In one embodiment, a buffer (e.g., COSB 271) is segmented into buffer fill regions. In one exemplary implementation, the buffer fill regions are symmetrical with respect to a buffer target fill value (e.g., half full). A self-convergence factor is associated with each of the buffer fill regions and the fair rate is adjusted in accordance with the corresponding self-convergence factor. The self-convergence factor drives a fair rate towards a value that facilitates maintenance of a target buffer fill level. In one exemplary implementation, the self-convergence factor is kept at 1 in a green convergence buffer fill region.

Figure 3:
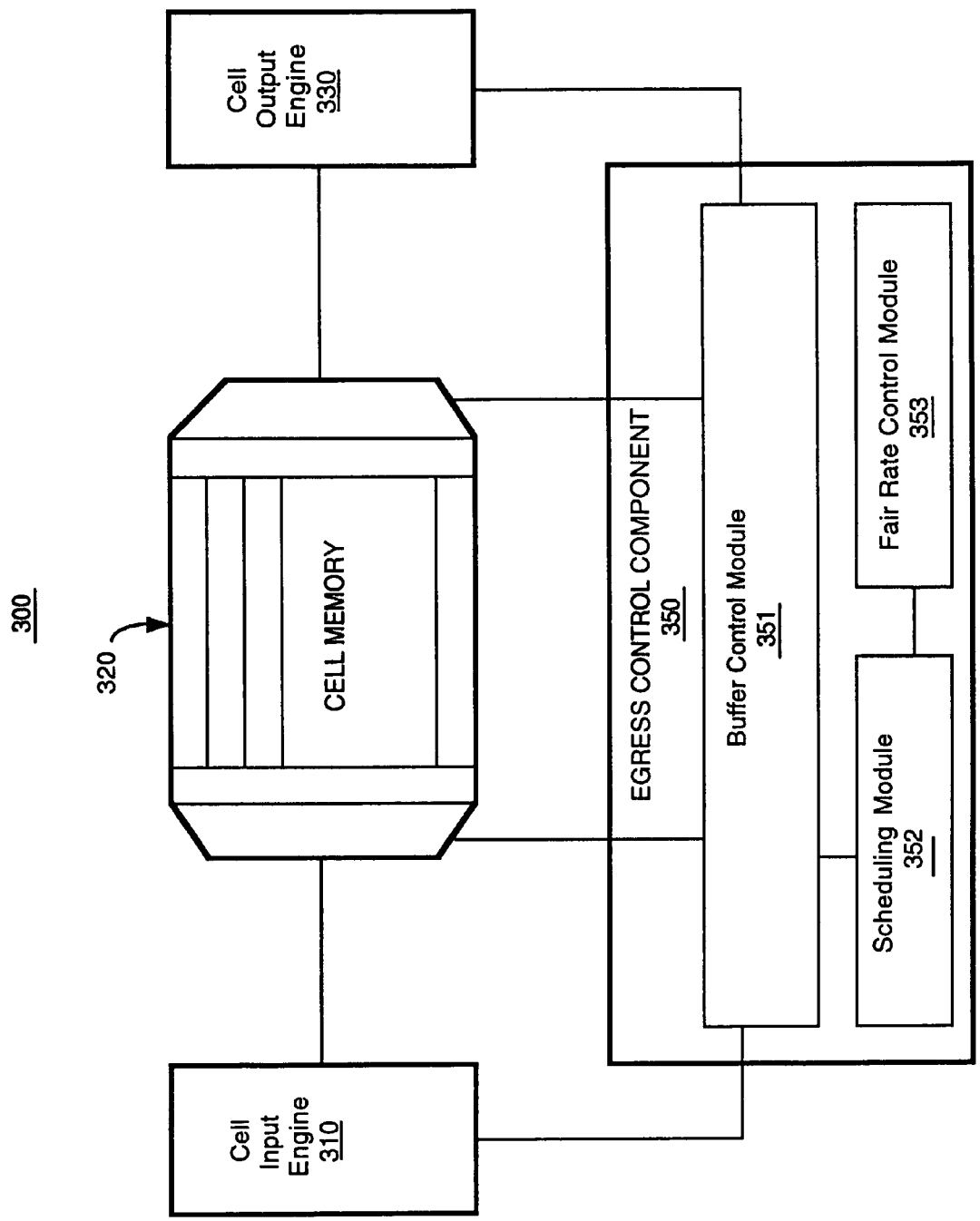
FIG. 3 illustrates a block diagram of a structure of an egress system according to one embodiment of the present invention.

FIG. 3 illustrates a block diagram of an egress system 300 in accordance with one embodiment of the present invention. In one exemplary implementation, egress system 300 is included in a network node (e.g., router, switch, etc.). Egress circuit 300 includes cell input engine 310, cell memory 320, cell output engine 330, and egress control component 350 comprising buffer control module 351, scheduling module 352, and fair rate control module 353. Egress control component 350 is coupled to cell input engine 310, cell memory 320, cell output engine 330. The components of egress circuit 300 cooperatively operate to communicate information out of a node (e.g., a router or switch). Egress control component 350 controls the flow of cells through egress system 300. It is appreciated that the components of egress control component 350 can be implemented in hardware, software, firmware or combinations thereof. For example, buffer control module 351, scheduling module 352 and fair rate control module 353 can be software instructions embedded on computer readable medium, wherein the instructions direct communication of information through egress system 300.

Cell input engine (CIE) 310 receives incoming cells on port or bus interface circuits (not shown). CIE 310 can store the received cells in internal queues before converting the information for storage in cell memory 320. After CIE 310 receives a cell, it extracts the cell's connection, source and other information, and presents the information to buffer control module 351 for processing.

Cell memory 320 stores the actual cells. The cell memory 320 can have a variety of configurations including an off-chip memory such as a DRAM. In one embodiment of the present invention, cell memory 320 is partitioned into multiple buffer areas or regions. For example, cell memory 320 is partitioned into a plurality of virtual connection buffers and class of service buffers.

Buffer control module 351 controls the flow of cells through egress system 300. Buffer control module 351 also directs the storage of flow control information in various data structures (e.g., in on-chip registers and/or off chip memories, etc.). The flow control information is utilized to control the flow of cells through egress circuit 300. For example, buffer control module 351 manages the storage of information on the configuration of egress system 300 components (e.g., the buffer boundaries of cell memory 320) and state information on the progress of a cell through egress system 300. Buffer control module 351 also manages the storage of statistics for each connection or "virtual connection" (VC) supported by the node of egress system 300 (e.g., the COSB that a VC is mapped to, service group indication, the discard state, cell count information, etc.).

Upon receipt of the cell related information provided by CIE 310, buffer control module 351 checks if egress circuit 300 is capable of accommodating the cell (e.g., has enough available storage space in a VC buffer, COSB, etc.). In one exemplary implementation, the cell is discarded if it can not be accommodated by egress system 300. If the cell can be accommodated by egress system 300 (e.g., there is available space in appropriate queues), buffer control module 351 controls the storage of the cell in cell memory 320 including where in cell memory 320 to store the cell. For example, buffer control module 351 controls movement of a cell from the head of a connection queue to the tail of an associated class of service queue. The scheduling of when the information is moved between storage locations is controlled by scheduling module 352. Scheduling module 352 also dictates the connection rate at which the information is moved between storage locations in accordance with one embodiment of the present invention.

Scheduling module 352 controls the timing and rate at which information is moved from a connection queue (e.g., in a connection buffer) to a class of service queue (e.g., in a COSB) in accordance with a connection rate, wherein the connection rate is dynamically adjusted in accordance with a fair rate value. The connection rate can also be adjusted in accordance with a weighted value. To control the information (e.g., cell) movement or communication rate, scheduling module 352 receives an indication of a fair rate value from the fair rate control module 353.

Fair rate control module 353 determines a "fair rate" for servicing connection queues belonging to each class of service queue. Fair rate control module 353 retrieves fair rate related information, including the amount of information is stored in a buffer, the amount of information removed from a buffer, an actual buffer fill level, a self-convergence factor value associated with the actual buffer fill level, etc. In one embodiment of the present invention, fair rate related information can be obtained from the above-described statistics maintained by buffer control module 351. A fair rate value is determined by multiplying an existing fair rate by the buffer flow ratio and the self-convergence factor. In one exemplary implementation, fair rate control module 353 performs a self converging communication fair rate control method (e.g., a self converging communication fair rate control method 100)

Scheduling module 352 provides the connection rate value to buffer control module 351 which in turn utilizes the connection rate value to direct the movement of the information between the buffer queues. For example, connection or virtual connection (VC) queues can be serviced in a round robin fashion according to the fair rate value multiplied by weighted value of 1 for each VC queue or the VC queues can be serviced in a weighted round robin fashion according to a fair rate value multiplied by a different weighted values (e.g., a WV of 1 for VC queue 1, a WV of 2 for VC queue 2, a WV of 7 for VC queue 3, etc.).

Buffer control module 351 also controls departures of cells via cell output engine (COE) 330. In one embodiment, cells depart from a service group queue supplied with information from a COSB and buffer control module 351 is responsible for selecting a COSB for service. Once a COSB has been selected for service, buffer control module 351 finds the cell memory 320 location of the cell at the head of the selected COSB and the cell at the designated storage location is read out of cell memory 320 to COE 330. Connection information from the departing cell is extracted and provided to buffer control module 351 which uses this information to retrieve and update the connection queue and class of service queue statistics and cell counts.

In one embodiment of the present invention, the connection rate value is provided to other network nodes. For example, the connection rate value can be utilized for a variety of network activities, including determination of a "bottleneck" rate for a port and or explicit rate (ER) control activities. The connection rate value can be included or "stamped" in the header field of a cell.

Thus, the present invention facilitates efficient and effective utilization of available bandwidth while minimizing fluctuations in buffer fill levels. The present invention also reduces fluctuation swings in fair rate values. Present invention systems and methods provide self converging fair rates that facilitate support of a target buffer fill level and smooth flow of information through a node (e.g., router, switch, etc.) and a network as a whole. The rates are adjusted to provide self convergence of an actual buffer fill level towards an optimized target buffer fill level that facilitates fair access by multiple queues (e.g., connection queues) to the buffer capacity (e.g., of a COSB) and maximizes utilization of available bandwidth. The convergence of an actual buffer fill level towards an optimized target buffer fill value also reduces buffer underruns and overruns, helping to minimize information being dumped and lost. The present invention also provides fair rates that increase the accuracy of explicit rate indications and minimizes traffic flow congestion in a network.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A self converging communication fair rate control method comprising:
   identifying a fair rate value at which an amount of information is entered in a buffer;
   establishing self-convergence factors that minimize a fluctuation in said fair rate value;
   determining a buffer flow ratio as the ratio of an amount of information moved out of said buffer to said amount of information entered in said buffer;
   adjusting said fair rate value towards an adjusted fair rate value that corresponds to a target buffer fill level in order to keep said buffer from reaching a full capacity buffer fill level, based upon said buffer flow ratio and said self convergence factors; and
   designating buffer fill regions in said buffer corresponding to different buffer fill levels, wherein each of said buffer fill regions is associated with different self convergence factors that adjust said fair rate value according to said buffer fill levels.

2. The self converging communication fair rate control method of claim 1 wherein said target buffer fill level is less than said full capacity buffer fill level.

3. The self converging communication fair rate control method of claim 2 wherein said target buffer fill level is approximately one half of said full capacity buffer fill level.

4. The self converging communication fair rate control method of claim 1 wherein said self-convergence factors decrease fair rate values that result in a buffer filling up and increase fair rate values that result in a buffer emptying out.

5. A self converging communication fair rate control method comprising:
   identifying a fair rate value at which an amount of information is entered in a buffer;
   establishing self-convergence factors that minimize a fluctuation in said fair rate value;
   determining a buffer flow ratio as the ratio of an amount of information moved out of said buffer to said amount of information entered in said buffer;
   adjusting said fair rate value towards an adjusted fair rate value that corresponds to a target buffer fill level in order to keep said buffer from reaching a fall capacity buffer fill level, based upon said buffer flow ratio and said self convergence factors;
   designating buffer fill regions in said buffer corresponding to different buffer fill levels; and
   initializing said fair rate value to an initial value that corresponds to a buffer fill level located at an approximate midpoint of said buffer fill regions.

6. The self converging communication fair rate control method of claim 5 wherein said buffer is a class of service buffer for collecting and temporarily storing information associated with a class of service.

7. The self converging communication fair rate control method of claim 5 wherein said self-convergence factors decrease fair rate values that result in a buffer filling up and increase fair rate values that result in a buffer emptying out.

8. A switch system comprising:
   a port for communicating information;
   a buffer for temporarily storing said information, said buffer coupled to said port, wherein said buffer comprises:
      an upper buffer region associated with a first self-convergence factor; and
      a lower buffer region associated with a second self-convergence factor, the first self-convergence factor configured to adjust said fair rate at a faster rate than said second self-convergence factor; and
   a processor for directing communication of information to and from said buffer, wherein information is communicated to said buffer at a fair rate adjusted for actual buffer fill level and a buffer target fill level, wherein said fair rate is adjusted to converge on said buffer target fill level that is approximately one half of a full capacity of said buffer, said processor coupled to said buffer.

9. The switch system of claim 8 wherein said buffer is segmented into buffer fill regions corresponding to varying buffer fill levels.

10. The switch system of claim 9 wherein each of said buffer fill regions is associated with different self convergence factors that adjust said fair rate value according to said buffer fill levels.

11. The switch system of claim 8 wherein different self-convergence factors are associated with each of said lower and upper buffer fill regions and said fair rate is adjusted in accordance with said self-convergence factors.

12. The switch system of claim 8 wherein said self-convergence factors drive a fair rate towards a value that facilitates maintenance of said buffer target fill level.

13. The switch system of claim 8 wherein said buffer target fill level is half fall.

14. The switch system of claim 8 wherein said buffer is a class of service buffer for collecting and temporarily storing information associated with a class of service.

15. A computer readable medium with instructions embedded therein for causing one or more processors to perform a method for directing communication of information through an egress system of a network node, the method comprising:
   controlling storage of information in a connection queue and class of service queue;
   directing movement of said information from said connection queue to said class of service queue in accordance with a fair rate, wherein said fair rate is dynamically adjusted based upon a buffer flow ratio of an amount of information moved out of said class of service queue to said amount of information entered in said class of service queue and a self-convergence factor that minimize a fluctuation in said fair rate; and
   designating a plurality of buffer fill regions in said class of service queue corresponding to a plurality of buffer fill levels, wherein one or more of said plurality of buffer fill regions is associated with different self-convergence factors that adjust said fair rate according to one or more of said plurality of buffer fill levels.

16. The computer readable medium of claim 15 wherein said fair rate adjusted to converge on a target fill level that is approximately one half of a full capacity of said class of service queue.

17. The computer readable medium of claim 15 further comprising:

managing a storage of component configuration information;

managing a storage of state information on a progress of a cell through an egress system; and managing a storage of statistics for each virtual connection supported by a node of an egress system.

18. The computer readable medium of claim 15 further comprising determining a fair rate of servicing said connection queue belonging to said class of service queue.

19. The computer readable medium of claim 15 wherein said fair rate is determined by observing a length of a class service queue, the amount of information arriving in and departing from said class of service queue over the course of a defined interval and adjusting said fair rate by a ratio of said amount of information departing from and arriving in said class of service queue and a self-convergence factor.

20. The computer readable medium of claim 15 wherein said fair rate value is determined by multiplying an existing fair rate by said buffer flow ratio and said self-convergence factor.

21. A self-converging communication fair rate control system comprising:

means for performing a self converging communication fair rate control method; and means for controlling communication of multiple streams of information into a buffer comprised of a plurality of buffer fill regions, wherein a self-converging fair rate is utilized to establish a connection rate for communication of multiple streams of information into said buffer; and means for adjusting said self-converging fair rate towards an adjusted fair rate value that corresponds to a target buffer fill level which is less than a full capacity buffer fill level of said buffer, wherein one or more of said plurality of buffer fill regions is associated with different self-convergence factors that adjust said self-converging fair rate according to one or more of said plurality of target buffer fill levels.

22. The self-converging communication fair rate control system of claim 21 wherein said fair rate related information is obtained from statistics maintained by said means for controlling communication of multiple streams of information into said buffer.

23. The self-converging communication fair rate control system of claim 21 wherein said self-converging fair rate is adjusted by multiplying the existing fair rate by a buffer flow ratio and a self-convergence factor.

24. The self-converging communication fair rate control system of claim 23 wherein a fill level of said buffer is examined and a correlating corresponding self-convergence factor is utilized to establish said self-converging fair rate.

25. The self-converging communication fair rate control system of claim 23 wherein a buffer flow ratio is the ratio of the amount of information departed from said buffer during a period compared to the amount of information received in said buffer during said period and said flow ratio is utilized to establish said self-converging fair rate.

* * * * *

UNITED STATES PATENT AND TRADEMARK OFFICE
CERTIFICATE OF CORRECTION

PATENT NO. : 7,420,919 B1 Page 1 of 1
APPLICATION NO. : 10/705152
DATED : September 2, 2008
INVENTOR(S) : Farzam Toudeh-Fallah et al.

It is certified that error appears in the above-identified patent and that said Letters Patent is hereby corrected as shown below:

On the Title Page Item -56- (Other Publications) line 9, please delete "Swtiched" and insert -- Switched --, therefor.

On the Title Page Item -56- (Other Publications) line 9, please delete "aGigabyte" and insert -- a Gigabyte --, therefor.

At column 3, line 52, after "invention" insert -- . --.

At column 10, line 19, after "100)" insert -- . --.

At column 11, line 58 of Claim 5, please delete "fall" and insert -- full --, therefor.

At column 12, line 40 of Claim 13, please delete "fall." and insert -- full. --, therefor.

Signed and Sealed this

Seventh Day of April, 2009

JOHN DOLL
*Acting Director of the United States Patent and Trademark Office*